Sept. 7, 1943.  J. A. BOYER ET AL  2,328,780
PROCESS FOR REMOVING OF INTERGRANULAR
GRAPHITE FROM BORON CARBIDE
Filed Feb. 14, 1940
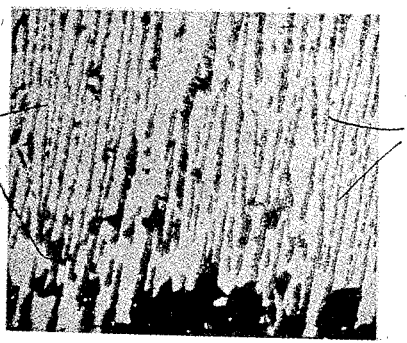
FIG. I.
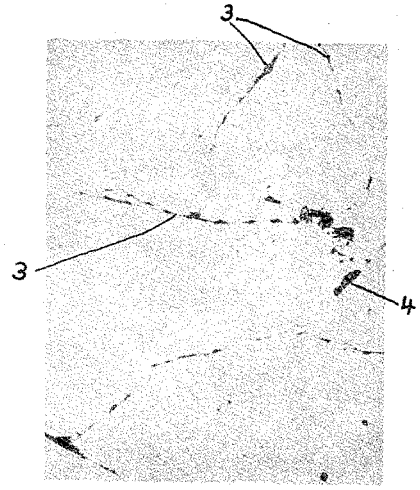
FIG. II.
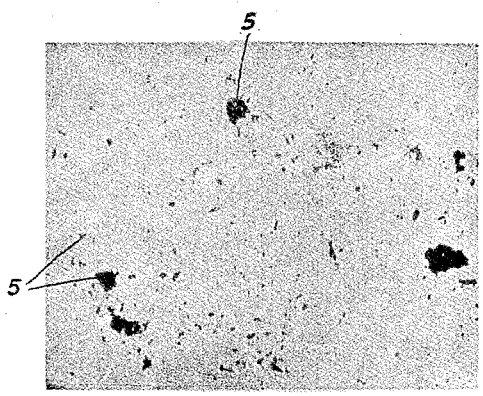
FIG. IV.
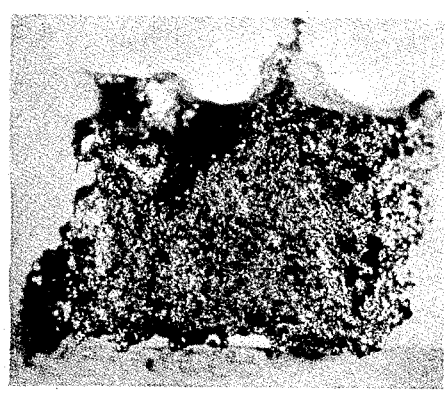
FIG. III.
FIG. V.
John A. Boyer
Carl G. Rose.  INVENTORS
BY
THEIR ATTORNEY Patented Sept. 7, 1943

2,328,780

UNITED STATES PATENT OFFICE 2,328,780

PROCESS FOR REMOVING OF INTERGRANULAR GRAPHITE FROM BORON CARBIDE

John A. Boyer and Carl G. Rose, Niagara Falls, N. Y., assignors to The Carborundum Company, Niagara Falls, N. Y., a corporation of Delaware Application February 14, 1940, Serial No. 318,882

10 Claims. (Cl. 106—43)

This invention relates to methods by which boron carbide compositions may be rendered free from deleterious carbon or graphite, and to the products thus obtained.

Boron carbide is an extremely hard substance commercially manufactured by the reduction of boric oxide with carbon. In some commercial forms, the boron carbide is contaminated with flakes of graphite to such an extent that it has, in mass, a distinctly laminated structure and consequently, is of no practical value as an abrasive. In some cases, the graphite is present in amounts up to about 25%. When the reduction is performed in a resistance type electric furnace using a central conducting core of carbon which is surrounded by the raw mixture of boric oxide and carbon, products are obtained containing very small amounts, from 1% to 2%, of free graphite. These products do not have the laminated structure spoken of above and it would appear that the amount of graphite present is of negligible importance.

However, the fracture of this material is distinctly granular and it is lacking in toughness. Microscopical examination of this material containing only small amounts of graphite reveals that this graphite has, for the most part, separated from the boron carbide as very thin randomly oriented films located between and outlining at least a portion of the boron carbide grains. The boron carbide products containing these intergranular films appear normal in the sense that the development of the boron carbide grains has apparently not been interrupted or inhibited as is the case where flakes of graphite impart a laminated structure. Nevertheless the value of the boron carbide for abrasive purposes is materially reduced due to the presence of the intergranular films and it is an object of our invention to provide a method by which these films may be eliminated.

By the method of our invention, we eliminate these thin intergranular films of graphite, and thus change the fracture of the mass of boron carbide from a granular to a metallic one. The result in boron carbide is demonstrated by an increased toughness. Examples of the several ways in which our method may be carried out are set forth hereinafter.

In the drawing:

Figure I shows the microstructure of a sample of boron carbide containing a comparatively large amount of graphite as flakes 1 which give a laminated structure to the material.

Figure II shows the microstructure of a sample of commercial boron carbide in which there is so little graphite that the structure is not laminated but which still contains some graphite as thin films 3 outlining many of the grains of the boron carbide. There are some pores in the material as indicated at 4.

Figure III shows the broken face of a lump of the product the microstructure of which is shown in Figure II. The granular fracture characteristic of this type of product is clearly visible.

Figure IV shows the microstructure of a boron carbide sample differing materially from the sample pictured in Figure II only by having been treated in accordance with our process to eliminate the intergranular graphite films 3. This sample is somewhat porous, some of the pores being indicated at 5.

Figure V is a picture of the broken face of a lump of the product the microstructure of which is shown in Figure IV and clearly shows the metallic fracture obtainable by the use of our process.

In the practice of our invention we employ, as fluxes, oxygen-containing compounds of carbide-forming elements. Boron carbide is formed and has a fusion point above 2000° C. and we employ only those oxygen-containing compounds of carbide forming elements which volatilize only to a comparatively slight extent under the conditions of the process. Moreover, it is desirable that the carbides of these elements should not be decomposed by heat alone at temperatures below those employed in the process.

Example I

When boron carbide of the type shown in Figures II and III containing about 2% or less graphite as thin intergranular films is fused with a small amount, less than 4% of silicon dioxide, the mass after fusion will be found entirely free of intergranular graphite films and will exhibit a metallic fracture of the type shown in Figure V instead of the granular fracture like that shown in Figure III exhibited by the boron carbide before fusion. The silicon dioxide may be admixed with the boron carbide before fusion or if the fusion is carried out in a container the silicon dioxide may be placed in the bottom thereof as it will be admixed with the boron carbide by convection. The precise amount of silicon dioxide needed may be readily determined by calculation for each lot of boron carbide.

Example II

If a mixture of carbon, boric oxide and silicon dioxide is reduced in the usual manner in which boron carbide is formed, the silicon dioxide being present in such an amount as will be expected to form a very small amount (in the neighborhood of 5 to 6% or less) of silicon carbide, it will be found that the boron carbide product is substantially free from detectable graphite. Occasional crystals of silicon carbide may be observed but their effect is unobjectionable since silicon carbide is almost as hard as boron carbide and its manner of occurrence is such as not to essentially change the physical properties of the silicon carbide.

Other examples of the oxygen containing compounds of carbide forming elements usable for our process either alone or as mixtures are aluminum silicates such as kaolin and pyrophyllite, boron, aluminum, titanium, zirconium and chromium oxides, and zirconium silicate. These substances are mentioned only by way of example. It will be obvious that there are many other members of the above-mentioned class which conform to the requirements set forth above and are hence usable for our purpose.

If silicon dioxide is employed in the practice of our invention the pure form need not be used since various forms of naturally occurring silica and amorphous silica such as flint, diatomaceous earth and the like may be employed. If fluxes other than silicon dioxide are used, the boron carbide product will contain very small amounts of the reaction products of these materials but these reaction products will be present in such minor amounts as not to materially affect the properties of boron carbide.

Boron carbide substantially free from intergranular graphite films may also be obtained by adding small amounts, i. e., a few percent, of silicon carbide to molten boron carbide.

This application is a continuation in part of our copending application Serial No. 191,686, filed February 21, 1938.

Having thus described our invention, we do not desire the same to be restricted to the practice of the precise details described but wish to be bound only by the scope of the appended claims.

We claim:

1. The method of producing fused products consisting essentially of boron carbide and characterized by substantial freedom from graphite, including intergranular graphite films, which comprises fusing boron carbide containing small amounts of free graphite with an amount of a flux comprising an oxygen-containing compound of a carbide-forming element, the carbide of which element is thermally decomposed only at temperatures above those employed in the process and the oxygen containing compound of which volatilizes only to a comparatively slight extent under the conditions of the process, sufficient to combine with the free graphite.

2. The method set forth in claim 1 in which the flux comprises silicon dioxide.

3. The method set forth in claim 1 in which the flux comprises aluminum silicate.

4. The method set forth in claim 1 in which the flux comprises alumina.

5. The process for removing intergranular graphite films from fused products consisting essentially of boron carbide which comprises fusing the boron carbide with a sufficient amount of a flux comprising an oxygen-containing compound of a carbide-forming element, the carbide of which element is thermally decomposed only at temperatures above those employed in the process and the oxygen containing compound of which volatilizes only to a comparatively slight extent under the conditions of the process, to combine with the graphite whereby a product free from laminations or flakes and intergranular films of graphite and having a metallic fracture is obtained.

6. As a new manufacture a fused product consisting essentially of boron carbide in massive form which is free from laminations or flakes and intergranular films of graphite, and has a metallic fracture, and a small, insignificant amount of another carbide.

7. A fused product consisting essentially of boron carbide in massive form having an unlaminated structure and a metallic fracture and free from intergranular films of graphite, and a small, insignificant amount of another carbide.

8. The method set forth in claim 1 in which the oxygen-containing compound of a carbide-forming element is selected from the group consisting of aluminum silicate, zirconium silicate and the oxides of boron, aluminum, titanium, zirconium, chromium and silicon.

9. The process set forth in claim 5 in which the oxygen-containing compound of a carbide-forming element is selected from the group consisting of aluminum silicate, zirconium silicate and the oxides of boron, aluminum, titanium, zirconium, chromium and silicon.

10. As a new manufacture, a fused product consisting essentially of boron carbide, said product being characterized by massive form, a metallic fracture, and a crystal to crystal contact which precludes the presence of laminations and intergranular films of graphite, and containing a small, insignificant amount of at least one other carbide.

JOHN A. BOYER.
CARL G. ROSE.